Patented May 22, 1951

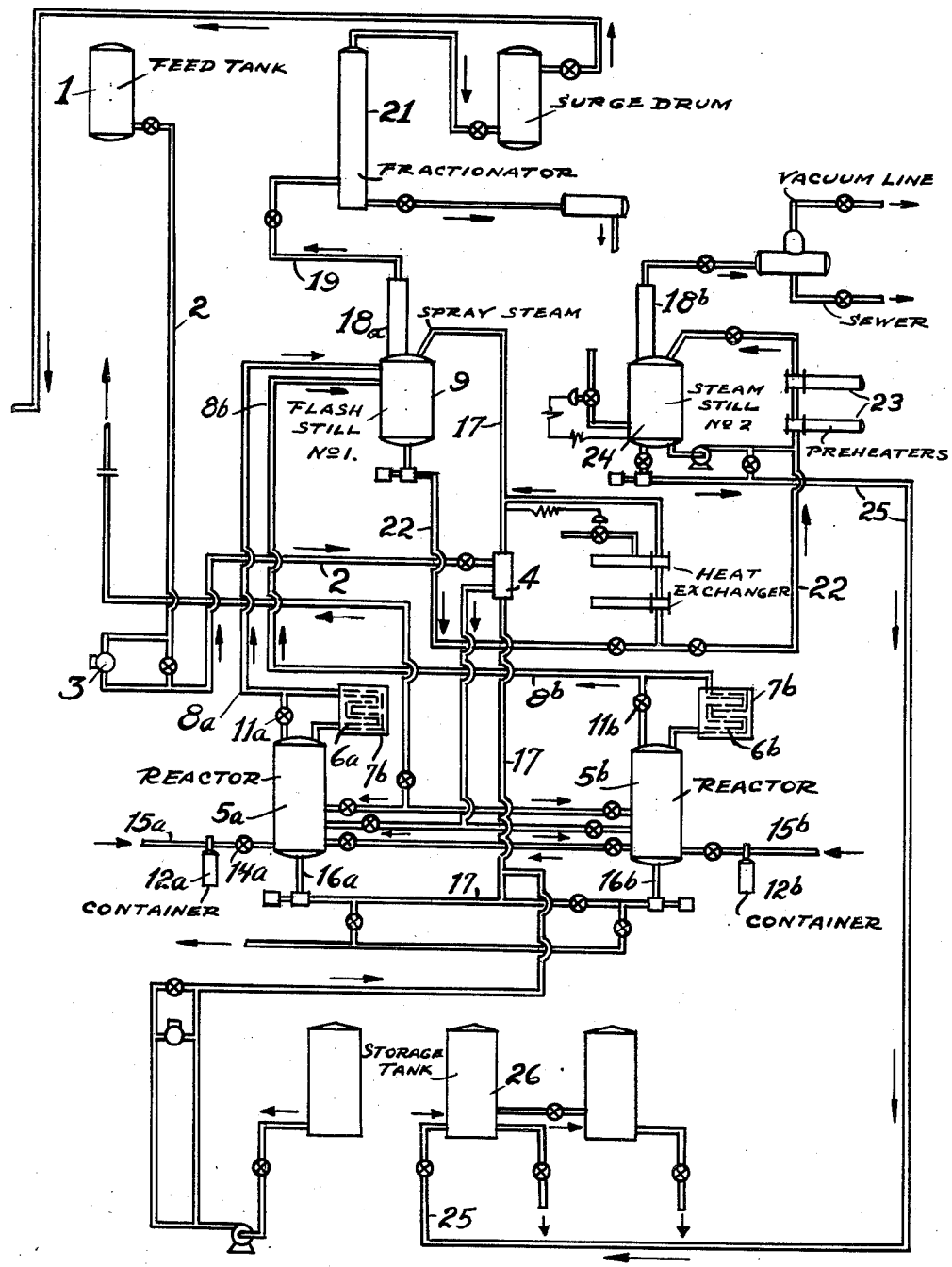

2,554,280

UNITED STATES PATENT OFFICE 2,554,280

PREPARATION OF RESIN-DRYING OIL MIXTURE

Osgood V. Tracy, Short Hills, N. J., assignor to Standard Oil Development Company, a corporation of Delaware Application July 21, 1945, Serial No. 606,445

7 Claims. (Cl. 260—23.7)

This invention relates to low temperature interpolymers; relates particularly to a low temperature interpolymerization process; and relates especially to the combination of a low temperature interpolymerization process and a solution process to yield a solution of heat-bodiable, drying resin in a heat-bodiable drying oil.

It has been found that while the diolefins, particularly butadiene, may be polymerized at low temperature by Friedel-Crafts catalysts, the resulting polymers are powders which are insoluble and infusible and of very little utility because of the insolubility and infusibility.

It is now found that in the presence of various modifying agents, or copolymerizates, particularly the mono- or iso-olefins having from 3 to 20 carbon atoms per molecule, the character of the polymerization reaction is very greatly changed to yield a copolymer or interpolymer which is composed of a major proportion of the multi-olefin and a minor proportion of the iso-olefin. This polymer is a solid resin of low elasticity, non-rubbery in character, but of fair strength, readily soluble in a wide range of solvents including such substances as the hydrocarbons generally, and a wide range of the natural and synthetic oils and resins. In addition, the material may have, to a more or less degree, according to the percent conversion of the original mixture, and the degree of cyclization of the finished polymer, the unique property of heat bodying without molecular weight breakdown or discoloration.

As produced, the resin has a relatively high iodine number, usually between 30 and 275, and it has in addition the important property of oxidation drying in a manner analogous to that of the drying oils. Of particular importance is the fact that it is readily soluble in the natural and synthetic oils and the drying and baking oils generally; and can be heat bodied while in such solution to yield extremely valuable varnish and paint compositions.

It is now found that the material, by proper choice of reaction mixture, can be produced in the form of a thick, viscous multicomponent solution by partial polymerization in the presence of appropriate solvents to yield a fluid composition which can be handled through pipes and pumps; from which the interpolymer is readily recovered, or from which solution the polymer is readily transferred to solution in some other desired solvent such as linseed oil, tung oil, oiticica oil, soy bean oil, dehydrogenated castor oil, fish oil, chia oil, or the like.

According to the present invention, the apparatus for conducting the process may consist of one or more reactors into which there is charged a reaction mixture of a multi-olefin such as butadiene and an isoolefin such as the octene obtained by dimerization of isobutylene; together with a refrigerant to cool the mixture, such as liquid or solid carbon dioxide, or liquid propane or liquid methyl chloride or liquid ethane or even liquid ethylene, and, in some instances where too low a temperature is not required, liquid butane; and there may also be present ethyl chloride from a catalyst solution. The ethyl chloride catalyst solution is introduced in the form of a stream below the surface of the rapidly stirred material; and should contain dissolved therein a substantial quantity, usually 2% to 6 or 7%, of a Friedel-Crafts type catalyst such as aluminum chloride. The reaction is preferably carried to the stage of polymerization of a part only of the olefinic material, usually from 60% to 80%. Simultaneously, a substantial portion of the propane and other material which is volatilized out by the heat of reaction is returned to the polymerization mixture by a reflux condenser, and along with it there is returned a substantial proportion of the multi-olefin which in the case of butadiene would otherwise be lost. This cold reflux also supplies much of the refrigeration needed for the heat of reaction. At 60% to 80% yield, the material is a heavy syrupy liquid from which the solid polymer may be precipitated, if desired, or may be delivered to a warm oil such as linseed oil or those above listed, in which the whole reaction mixture is soluble, from which the low boiling components are removed by volatilization or by steam or vacuum stripping.

For many uses of the resin the details of the recovery method are of minor consequence, so long as the resin is obtained in reasonably pure form free from most of the solvents in which the polymerization was conducted. For other uses, especially where it is to be admixed with substances which are chemically sensitive, it may be desirable to use greater care in the details of the separation, since it is found that with some materials, the presence of alkaline matter along with residual traces of catalyst results in a troublesome discoloration or decomposition of the added materials. For such purposes, the catalyst is preferably destroyed by the use of such materials as small quantities of alcohol, ethers, aldehydes or organic acids, all of which yield aluminum oxides or hydrates;

and organic chlorides, both of which are inert and harmless, and, in addition, are easily removed.

According to the present invention, the polymerization mixture is transferred cold from the polymerizers into warm linseed oil, or the like, preferably after an interposed treatment for the destruction of the catalyst. This treatment preferably consists in the addition to the cold polymerization mixture of a small amount of alcohol such as ethyl alcohol, or methyl alcohol, or propyl alcohol, or butyl alcohol, or the like, or an ether or an aldehyde or an organic acid. Of these various substances, propyl alcohol is preferred, and preferred in the amount of approximately 0.1% to 3% on the amount of polymerizate mixture. It may be noted that the amount of alcohol preferably is sufficient to combine with all of the catalyst and leave a small excess, without being sufficient in amount to precipitate the solid resin. The alcohol is preferably stirred into the polymerizate mixture, which is then transferred to the warm linseed oil.

The warm linseed oil then boils off all of the refrigerant, all of the unpolymerized butadiene and all of the catalyst solvent; and the residual catalyst being in the oxide form does not harm, influence or modify either the linseed oil or the dissolved polymer. It is further found that the unpolymerized residue of isobutylene dimer can then be steam-stripped from the solution of polymer in linseed oil, also without harm to the resin or linseed oil, and at the same time the catalyst is completely inactivated and converted into a condition which permits of ready removal by filtering, if desired, or into a harmless condition such that it may be left in the mixture without injury. The result is a solution of the polymer in linseed oil which is ready for a heat-bodying step which simultaneously heat bodies both the polymer and the oil, bringing both materials into condition such that they may be "cut back" with light naphtha or other solvent to produce a high-grade varnish or paint base.

Thus the process of the invention copolymerizes a major proportion of a multi-olefin with a minor proportion of a mono-olefin at a temperature within the range between $+10°$ C. and $-103°$ C.; preferably under reflux conditions, to return to the reaction mixture most of the refrigerant-diluent and volatilized olefinic material; to produce a polymer solution which is then transferred directly to warm linseed oil, dissolved therein, and the volatiles removed therefrom without injury to the polymer or linseed oil; and to produce a material which is highly satisfactory for heat-bodying into a high-grade varnish or paint base. Other objects and details of the invention will be apparent from the following description, when read in connection with the accompanying drawing; wherein:

The single figure is a diagrammatic view and flow sheet of the apparatus and process of the invention for producing a linseed oil solution of the polymer.

In practicing the invention the reaction mixture is prepared in a supply and storage tank 1 which may, if desired, be jacketed with a refrigerant such as liquid propane or liquid carbon dioxide or pulverized solid carbon dioxide in isopropyl alcohol or the like. The reaction mixture preferably consists of a major proportion of a multi-olefin and a minor proportion of an isoolefin with a substantial proportion of diluent or diluent refrigerant.

For the multi-olefin the preferred component is butadiene but any multi-olefin having from 4 to 12 or 14 carbon atoms per molecule may be used. Other especially satisfactory substances are isoprene, piperylene, any of the dimethyl butadienes, dimethylallyl, myrcene, allo-ocymene, and the like. For the isoolefin, the preferred substance is the octene which is the dimer of isobutylene and known commercially as "dimer." This material is readily prepared by treatment of isobutylene with sulfuric acid which dimerizes the isobutylene to produce an iso-octene. Alternatively, any normal- or iso-olefin having from 3 to about 20 carbon atoms per molecule may be used. Propylene is useful although not as satisfactory as some of the other olefins. Isobutylene is usable but usually not preferred since it is undesirably easily polymerizable. The normal butenes, the normal and iso pentenes, the normal and iso hexenes and the normal and iso heptenes, octenes, nonenes and decenes are particularly satisfactory. In addition, any of the normal- or iso-olefins having up to 20 carbon atoms per molecule are usable and satisfactory.

There is desirably present also a diluent or a diluent-refrigerant. The preferred material is a diluent-refrigerant in the form of liquid propane since this gives a conveniently low temperature and is readily and completely mixable with both of the other components. Liquid butane, either normal or iso, is equally useful, although its higher boiling point provides less advantageous refrigeration. As simple diluents, such substances as pentane, hexane, heptane, octane and the like, or mixtures thereof, or mixtures of light naphtha or the like are similarly usable. Benzene is also usable although less satisfactory. In some instances, liquid ethane, or even liquid ethylene may be used, although these materials usually provide lower temperatures than are desirable for a satisfactory reaction. Alternatively, a considerable range of halogenated hydrocarbons, both mono- and poly-halogenated, may be used. Methyl chloride is usable as an excellent diluent-refrigerant although the temperature is not always as low as desirable. Liquid ethane is a highly desirable and advantageous diluent-refrigerant. Chloroform, ethylene dichloride and the like are also usable and effective diluents.

This mixture is prepared in the tank 1 and may be stored there as long as desired. If the tank is jacketed with a refrigerating jacket, the mixture remains in storage indefinitely with substantially no change. If the tank 1 is merely insulated, a steady loss of propane occurs which, however, is readily replaced, either as such, or by reflux condensation using solid $CO_2$ as coolant.

At the appropriate time the olefinic mixture is transferred through a pipe 2 either directly, or through an ammonia cooler 3, to a heat exchanger 4 and to a reactor 5A or 5B. The reactor is desirably filled approximately ⅔ to ¾ full. The respective reactors are equipped with reflux coils 6A and 6B in refrigerant containers 7A and 7B. Each container 7 is filled with a mixture of solid carbon dioxide and an alcohol such as propyl alcohol to improve the rate of heat transfer to the coil. The respective reflux coils 6 are connected by pipes 8A and 8B to a flash still 9, to which uncondensed volatile material is delivered for reprocessing. Valves 11 are also provided for by-passing the reflux coils 6.

The polymerization is conducted at a temperature below +10, and usually above —40, this being the preferred range, although in some instances the polymerization temperature may be as low as —103° C.

The catalyst may be any liquid or dissolved Friedel-Crafts halide material. Gaseous boron trifluoride is not a satisfactory catalyst since a sufficiently high concentration cannot be built up in the reactor and it tends to polymerize the butadiene alone into an undesirable polymer. The preferred type of catalyst is a strong solution or a saturated solution of aluminum chloride in methyl or ethyl chloride, the preferred concentration ranging from 0.8% to about 7%.

Alternatively, any of the catalysts disclosed by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used. That is, in addition to dissolved aluminum chloride, such substances as liquid titanium tetrachloride; or aluminum bromide, or aluminum chlorobromide, or aluminum alkoxy bromide in solution in the lighter petroleum hydrocarbons, or in solution in ethyl or methyl chloride, or carbon disulfide may be used.

For the solvent, practically any oxygen-free organic material having from 1 to 8 or 10 carbon atoms per molecule, which is liquid at temperatures below 0° C. thereby being low freezing, which may be vaporized away from the Friedel-Crafts catalyst with a change in temperature of no more than one or two degrees, thereby being non-complex-forming, may be used.

The catalyst is conveniently prepared in a container 12A or 12B. For this purpose the aluminum chloride may be placed in the container 12, cooled, and an appropriate amount of solvent added, the whole mixture then being stirred vigorously until the desired solution is obtained. The catalyst solution is then conveniently delivered by gas pressure through pipes 15A and 15B and filter 14A and 14B to the reactors 5A and 5B. This pressure may be obtained from compressed nitrogen or compressed carbon dioxide. It is preferable, however, not to use compressed air or anything contaminated with free oxygen. Alternatively, and in some instances preferably, the catalyst solution is prepared in a container, as shown, and pumped from the container into the reactor through an appropriate jet. In some instances, this procedure is superior, because of the fact that a relatively small jet may be used and a high pump pressure giving a better mixing of catalyst into the reaction mixture.

The liquid catalyst is preferably delivered in the form of a fine, relatively high pressure jet into the body of the rapidly stirred olefinic material in the reactor 5. It may be delivered continuously in the form of a very fine stream, or may be delivered intermittently in the form of a coarser stream. It is desirable that the time of addition of the catalyst amount to a substantial number of minutes depending upon the size of the reactor and the amount of olefinic material therein. If the batch is small, on the order of less than a gallon, the catalyst delivery time is conveniently one or two minutes. If the batch size is from one to fifty gallons, the catalyst delivery time desirably is from 5 to 15 minutes. If the batch size is 100 to 1000 gallons, the catalyst delivery time is conveniently in the neighborhood of one to four hours.

The polymerization reaction is exothermic and a substantial portion of the diluent or diluent refrigerant and a substantial portion of the olefinic material, depending upon the boiling point, may be volatilized by the heat of reaction. The vaporized material passes to the top of the reactor and into the reflux coil 6 and is there cooled and condensed by the refrigerant in the container 7. This refrigerant preferably is solid carbon dioxide since it is easily handled and inexpensive, and is a highly efficient refrigerant. Alternatively, the container 7 may be closed and may be filled with such refrigerants as liquid propane, liquid carbon dioxide, liquid ethane or liquid ethylene, or even liquid methane.

If the reaction mixture is the preferred one containing butadiene and isobutylene dimer with propane and a substantial amount of ethyl or methyl chloride solvent from the catalyst, the dimer having a boiling point of approximately +100° C. shows very little vaporization, the vaporized mixture contains as its major component, propane, as its minor component, butadiene, and a trace of ethyl chloride. All three are however condensed in the reflux coil 6, cooled to a temperature in the range between —40° C. and —78° C. and returned to the reaction mixture where they are rapidly stirred in. The boiling point of the mixture, because of the presence of considerable quantities of dimer and dissolved polymer, tends to be in the neighborhood of —25° C. to +0° C., and when the temperature gets down to about —40° C. too little evaporation occurs and the reflux produced does not bring in much additional cold liquid. Accordingly, even though the reflux condenser is intensively cooled, the temperature does not go much below the minimum boiling point of the mixture.

As above pointed out, it is usually preferable to halt the polymerization short of complete polymerization of all of the olefinic material in the original mixture. The preferred yield is from 60% to 80%. At this yield the contents of the reactor remains liquid in the form of a clear fluid of about the consistency of molasses, fluid enough to flow out of the reactor at reasonable speed, that is, the reactor usually can be emptied in less than three minutes. For this purpose, each of the reactors is equipped with bottom drains 16A and 16B leading to the pipe 17, the heat interchanger 4 and to a flash still 9. The flash still 9 is charged with a substantial quantity of warm linseed oil.

As delivered from the reactor, the polymerized solution tends to be colored, ranging from a strong yellow to a full red. This color apparently is produced by some sort of an interaction with the catalyst and it is desirable that this catalyst material be destroyed; and when the mixture is to be used in linseed oil, it is preferable that the catalyst be destroyed under acid conditions. For this purpose, there is desirably added to the polymerized mixture, either in the polymerizer or during discharge of the material from the polymerizer, a small amount of catalyst inactivator which is preferably an alcohol, ether, aldehyde, or organic acid, but may, if desired, be an acid salt. The amount is preferably less than 2 or 3%, but greater than the molecular equivalent of the amount of catalyst present. The catalyst inactivating agent decolorizes the mixture and converts the aluminum compounds into aluminum oxides or hydroxides which are inactive with respect to the linseed oil. It may further be noted that if the catalyst is quenched by alkaline material such as ammonia or lime or soda, the residual amounts of alkaline material are very harmful to the linseed oil solution, producing a very objectionable discoloration of the linseed oil during the heat-bodying step. Hence, if alkaline catalyst destroying agents are used, they must be very carefully removed before the polymer solution is added to the linseed oil.

The still 9 may conveniently be steam jacketed and may, if desired, be equipped with an injection coil for the direct injection of steam which is sometimes desirable with the warm linseed oil. The still 9 may be equipped with a condenser 18, and a pipe 19 connected to the condenser 18 leads to a fractionator 21 for the purification of the output vapors.

The polymerizate mixture from the reactor 5 delivered to the flash still 9 where it simultaneously dissolves in the warm oil therein and volatilizes out the residual diluent refrigerant, the residual catalyst solvent and the unpolymerized olefins which are discharged through the pipe 19 and the still 21 for fractionation and reuse. If desired, steam may be blown through the contents of the still to strip out the last traces of refrigerant, olefin and catalyst solvent. When the oil solution is fully stripped, it may be delivered to storage.

On some occasions, it is desirable to steam strip or water wash the solution, in which case the linseed oil solution may be delivered through the pipe 22 and through a preheater 23 to a second still 24 in which live steam or water as desired may be applied to the oil solution (under vacuum if desired). The finished oil solution is then discharged through a pipe 25 to a storage tank 26 from which it may be delivered for sale, or for further purification and processing in a suitable preheater, cooler, filter, etc.

The product thus obtained is a linseed oil solution of the resin in which the resin may comprise from 20% to 65%, or sometimes even more, of the mixture, depending upon the permissible viscosity. If the material is to be used directly, the polymer may be dissolved in the total amount of linseed oil required for the desired varnish, the varnish ratio usually being from 20% to about 50% of resin in the oil, which can be "cooked" as delivered from the stills. Alternatively, if the material is to be shipped, it is usually preferable to dissolve the polymer in a minimum amount of linseed oil to reduce the total bulk of material to be shipped—in which case the preferred concentration runs from 40% up to about 75%, depending upon the grade of linseed oil used and the permissible temperature, since at the higher concentrations the material usually must be steam heated to make it sufficiently fluid to be removed from tank cars.

The polymer so produced may have a molecular weight ranging from about 1,000 to about 20,000 (as determined by the Staudinger method), and an iodine number which may lie in the range between about 30 and 275, depending upon the relative proportions of the monoolefin and multi-olefin in the original polymerizate mixture.

It may be noted that in the polymerization reaction all of the unsaturation disappears from the monoolefin molecules, except perhaps the unsaturation of the last monoolefin molecule to be added to the polymer; and one unit of unsaturation disappears from each multi-olefin molecule.

Thus, if equal molecular proportions of monoolefin and diolefin are copolymerized, the resulting copolymer may have an unsaturation of 50 molecular per cent since there is a double linkage left in the chain for each two original molecules. If the polymerizate contains 75% of the diolefin molecules and 25% of the monoolefin molecules, the unsaturation becomes 75 molecular per cent. It may further be noted that if the polymer contained only butadiene (which, of course, is not possible if the iodine number is to be obtained) and there were no cross linkage, the unsaturation would be measured by an iodine number of approximately 454; and if the polymer contained 50% butadiene and 50% dimer, and there was no cyclization and no cross linkage, which is a condition not difficult to obtain in such a proportion, the iodine number would be approximately 228.

It may be noted that there is usually a little gel formation which indicates cross linkage and usually a little cyclization, both of which reduce the unsaturation below the theoretical value; also there are some indications that the Wijs method does not always measure all of the actual unsaturation in terms of the absorption of iodine, which may still further reduce the iodine number. Nevertheless, most of the polymers prepared according to the present invention have iodine numbers within the range between 30 and 275.

*Example 1*

Approximately 90 gallons of carefully dried "dimer" or diisobutylene were placed in an 800 gallon agitator, at room temperature, or slightly below. There were then added 200 gallons of commercial propane (or "C₃ cut") having a boiling point of approximately —40° C. It is not necessary that pure propane be used, but a refinery C₃ cut having approximately the following components may be used.

|  |  | Per cent |
|---|---|---|
| $C_2$ unsaturates | liquid volume | 0.6 |
| $C_2$ ethane | liquid volume | 2.5 |
| Propylene | liquid volume | 9.1 |
| Propane | liquid volume | 86.3 |
| $C_4$ | liquid volume | 1.5 |
| Total Unsaturates | gas volume | 10.2 |

The propane and dimer mixed readily and when the mixing was complete, the temperature was found to be approximately —20° F. (—28° C.). The mixture was prepared under reflux conditions; with volatilized propane returned to the mixture from a reflux condenser cooled to about —78° C. by a liberal supply of Dry Ice (solid $CO_2$) around the reflux condenser. (Propyl alcohol was used as heat transfer agent and the reflux condenser had a total area of approximately 170 square feet.)

To this cold liquid mixture there was then added approximately 135 gallons of dry butadiene; the butadiene being added at room temperature under about 20 pounds pressure. The rate of addition was such that the butadiene was cooled by the reflux coil sufficiently well to prevent a rise in pressure of more than ten or fifteen pounds; a valve being used on the reflux condenser outlet to prevent the escape of any substantial amount of butadiene. The addition of the butadiene brought the temperature of the mixture up to approximately —18° C. When the butadiene was added, the agitator was brought up to speed of approximately 1600 R. P. M. and the addition of the catalyst was begun. The catalyst consisted of a well-dried solution of aluminum chloride in ethyl chloride under a concentration of 4.3% or 4.3 grams of aluminum chloride per 100 ml. of solution. Approximately 39 gallons of catalyst solution were added over a time interval of approximately 120 minutes, the catalyst solution being pumped at nearly Dry Ice temperature through a small orifice submerged in the reactor contents.

When the desired amount of catalyst had been added, the material was red in color and of very high viscosity. The stirring was continued and approximately 20 gallons of isopropyl alcohol were added and well stirred in. The mixture was then colorless and while of relatively high viscosity, it was still sufficiently fluid to flow.

During the polymerization reaction, the steam still was charged with approximately 1000 pounds of linseed oil and brought up to a temperature of approximately 200° C. The cold solution containing only inactivated catalyst was then pumped from the reactor to the hot linseed oil through a pipe discharging below the surface of the linseed oil. At the high temperature of the linseed oil, the propane, the ethyl chloride, the unpolymerized butadiene and the unpolymerized dimer were volatilized out in gaseous form, and the polymer was transferred from solution in low boiling solvents to solution in the linseed oil. The addition of the cold polymerizate brought the temperature of the linseed oil down nearly to 100° C., but not low enough to be below the boiling point of the dimer, especially in view of the fact that additional amounts of heat were added to the still by high pressure steam in the still jacket.

The volatilized materials were passed through the condenser 18 which was held at a temperature of approximately 125° C. to condense any volatiles derived from the linseed oil, and the uncondensed material was delivered through the pipe 19 to the fractionator 21 in which the dimer was condensed and the lower boiling materials taken as overhead to a second fractionator in which the butadiene was condensed and recovered; with the propane and ethyl chloride taken overhead to a third fractionator in which the ethyl chloride was condensed and the C$_3$ cut taken overhead to a condenser in which it was recovered for further use. The various materials were separated, stirred and recycled to a subsequent polymerization operation.

When the polymerization mixture had been completely dissolved in the linseed oil and the volatiles completely boiled out, the linseed oil solution was found to have a light yellow color of approximately 12 on the Gardner scale and to be substantially thickened by the presence of the dissolved polymer.

This material was then cooked or bodied at 285° F. for approximately 8 hours and then cut back with light naphtha to yield a very satisfactory varnish base.

*Example 2*

A similar polymerization was conducted and the polymerizate was similiarly delivered into hot tung oil. The resin was similarly readily soluble in the hot tung oil to yield an excellent baking varnish base which was found to be of good color and excellent durability in service.

*Example 3*

A similar polymerization was conducted and the polymerizate was similarly delivered into hot oiticica oil. The resin was similarly readily soluble in the hot oiticica oil to yield an excellent baking varnish base which was found to be of good color and excellent durability in service.

*Example 4*

A similar polymerization was conducted and the polymerizate was similarly delivered into hot dehydrated castor oil. The resin was similarly readily soluble in the hot dehydrated castor oil to yield an excellent baking varnish base which was found to be of good color and excellent durability in service.

By the invention there is thus obtained a solution of polymer in a heat bodiable oil such as linseed oil, both oil and polymer being suitable for heat-bodying to yield a varnish or paint base.

While there are above disclosed but a limited number of embodiments of the process and products of the invention, it is possible to produce still other embodiments without departing from the inventive concept herein disclosed and it is therefore desired that only such limitations be imposed on the appended claims as are stated therein or required by the prior art.

The invention claimed is:

1. A process comprising the steps of mixing together a major proportion of butadiene and a significant minor proportion of diisobutylene, cooling the mixture to a temperature within the range between $+10°$ C. and $-40°$ C. by the addition of liquid propane, polymerizing the cold mixture by adding thereto a catalyst solution consisting of aluminum chloride dissolved in ethyl chloride, limiting the polymerization to 60% to 80% conversion of the olefinic material present by the addition of a small amount of a catalyst inactivator which destroys catalytic activity under acid conditions, thereby producing a light yellow polymer, retaining said polymer in solution, and immediately thereafter transferring the total cold polymerization mixture into a warm drying fatty oil to transfer the polymer directly from the cold solution to the warm fatty oil without at any time converting it to a solid and without discoloration, thereby volatilizing away substantially all of the remaining propane, butadiene, and ethyl chloride from the fatty oil-polymer mixture, and thereafter heat bodying the mixture of polymer and the fatty oil.

2. A process according to that described in claim 1 in which the fatty oil is dehydrated castor oil.

3. A process according to that described in claim 1 in which the fatty oil is linseed oil.

4. A process comprising the steps of mixing together about 135 parts by volume of butadiene and about 90 parts by volume of diisobutylene, cooling the mixture to a temperature within the range between $-18°$ C. and $-28°$ C. by the addition of about 200 parts by volume of liquid propane, polymerizing the cold mixture by adding thereto over a period of 120 minutes about 39 parts by volume of catalyst solution consisting of 4.3% of aluminum chloride dissolved in ethyl chloride, limiting the polymerization to 60% to 80% conversion of the olefinic material present by the addition of about 20 parts by volume of isopropyl alcohol, thereby producing a light yellow polymer, retaining said polymer in solution, and immediately thereafter transferring the total cold polymerization mixture into about 1,000 parts by weight of a drying fatty oil at about 200° C. to transfer the polymer directly from the cold reaction solution to the warm oil without at any time converting it to a solid and without discoloration, thereby volatilizing away substantially all of the remaining propane, butadiene, and ethyl chloride from the oil-polymer mixture, and thereafter heat bodying the mixture of polymer and oil by heating at about 285° F. for about 8 hours.

5. A process according to claim 4 in which the fatty oil is dehydrated castor oil.

6. A process according to claim 4 in which the fatty oil is tung oil.

7. A process according to claim 4 in which the fatty oil is linseed oil.

OSGOOD V. TRACY.

REFERENCES CITED

The following references are of record in the file of this patent:

UNITED STATES PATENTS

| Number | Name | Date |
|---|---|---|
| 2,039,364 | C. A. Thomas et al. | May 5, 1935 |
| 2,273,158 | R. M. Thomas et al. | Feb. 17, 1942 |
| 2,374,242 | Soday | Apr. 24, 1945 |

FOREIGN PATENTS

| Number | Country | Date |
|---|---|---|
| 106,371 | Australia | Jan. 26, 1939 |